United States Patent [19]
Juravinski et al.

[11] Patent Number: 5,915,333
[45] Date of Patent: Jun. 29, 1999

[54] HORSE RACE STARTING GATE

[76] Inventors: Charles Juravinski, P.O. Box 8220, Dundas, Ontario, Canada, L9H 5G1; Stephen Parazader, 44 Oak Avenue, Dundas, Ontario, Canada, L9H 4Y9

[21] Appl. No.: 09/115,505
[22] Filed: Jul. 15, 1998
[51] Int. Cl.⁶ ........................................ A63K 3/02
[52] U.S. Cl. .................... 119/423; 119/422; 119/425; 119/426
[58] Field of Search ...................... 119/423, 422, 119/425, 510, 502, 426

[56] References Cited

U.S. PATENT DOCUMENTS

| | | | |
|---|---|---|---|
| Re. 23,308 | 12/1950 | Phillips | 368/144 |
| 2,461,780 | 2/1949 | Smith et al. | 119/425 |
| 2,660,980 | 12/1953 | Giese | 119/425 |
| 2,800,877 | 7/1957 | Young | 119/425 |
| 4,233,938 | 11/1980 | Ruetenik | 119/425 |

*Primary Examiner*—Michael J. Carone
*Assistant Examiner*—Judith A. Nelson

[57] ABSTRACT

A starter assembly which is used to provide a staggered running start for horses racing around an oval track comprises a base portion which mounts the assembly in a vehicle moving at the front of the race and a gating system comprising a central gate member which is located between a pair of corresponding gate arms. The central gate member is pivotally secured to the base portion for swinging the central gate member from a race starting position extending diagonally of the track, and after the race has started, to a ready to fold position perpendicular the track with the gate arms in line with the central gate member. The gate arms are then folded forwardly in a balanced manner at opposite ends of the central gate member.

3 Claims, 6 Drawing Sheets

HORSE RACE STARTING GATE

FIELD OF THE INVENTION

The present invention relates in general to a starting gate used in the rear of a vehicle moving in front of a running start horse race around an oval track.

BACKGROUND OF THE INVENTION

As is known, in the horse racing art, a harness race is typically started by a vehicle carrying a starting gate moving at the front of the horse race. According to known practice, the starting gate extends in a transverse, i.e. perpendicular, position across the race track.

Harness horses, which draw the outside lanes, are at a very noticeable disadvantage relative to the horses in the more inside lanes. This has been statistically proven time and time again. All of the horses are trying to run along the inside rail which is the shortest route around the track. The farther the horse is from the rail at the start of the race, the longer the distance that horse has to travel both down and across the track to get to the rail before the first turn in the track. The problem becomes even more prominent when the track is relatively short because the first turn comes up so quickly. In fact, the way that harness races are currently run, the horse in the farthest outer lane will generally deliberately let the other horses move ahead to allow clearance for the outer lane horse to move across the track into last place in the race along the rail. This racing tactic is preferable to staying in the outside lane which requires the horse to run a much greater distance around the turn in the track.

Again, according to known procedure, the starting ate for a harness race is provided in the back of a vehicle moving in front of the race. This gate extends across the track such that all of the horses are in a level starting position behind the gate. As the horses reach the starting point of the race, the vehicle pulls away and the gate, which comprises two pivotal gate portions is folded to position the two gate portions along opposite sides of the vehicle. The vehicle can then slow down and pull off to the side of the track to allow the horses to pass.

A harness race starting gate of the type described above is shown in U.S. Pat. No. 2,660,980 issued Dec. 1, 1953 to W. E. Geist.

U.S. Pat. No. 4,233,938, issued Nov. 18, 1980, to Ruetenik, shows a slightly modified harness race starting gate where the two gate portions have additional folding features for compacting the size of each gate portion when then are in their folded positions.

It has been recognized in the past that some type of a handicapping system should be used in harness racing to make the start of the race equal to all of the horses. U.S. Pat. No. 2,800,877, issued Jul. 30, 1957, to P. A. Young, shows a vehicle mounted starting-gate which is used to provide staggered starting positions for the horses. The horses in the more outer lanes start in front of the horses in the more inner lanes yet all of the horses end up running the same distance through the race. The staggered start compensates for the distance that the outer horses must run across the track in order to reach the rail position.

Again, in the Young Patent there are two gate portions to opposite sides of the vehicle. These gate portions also fold forwardly beside the vehicle. However, because of the angling of the gate to provide the staggered start, one of the gate portions reaches its folded position before the other gate portion and the two gate portions do not end up in balanced positions on opposite sides of the vehicle. This creates a serious imbalancing of the vehicle itself, particularly because of the great length of each gate portion.

SUMMARY OF THE INVENTION

The present invention relates to a starter assembly which provides a staggered start for a harness horse race with the assembly including a gating system, with a pair of arms that fold in a balanced manner to opposite sides of the vehicle in which the starter assembly is carried. More particularly, the starter assembly of the present invention, which is used to provide a staggered running start for horses racing around an oval track comprises a base portion which mounts the assembly in the vehicle moving at the front of the race and a gating system comprising a central gate member pivotally secured to the base portion and a pair of corresponding gate arms which are pivotally mounted to opposite ends of the central gate member.

As the race is started, the central gate member is set diagonally relative to both the track and the vehicle with the gate arms in line with the central gate member. As the vehicle pulls away from the horses after the race is started, the central gate member is swung to a position perpendicular to both the track and the vehicle with the gate arms still being in line with the central gate member. Only after the central gate member has reached the perpendicular position are the gate arms folded from the in line position to a forwardly turned in position relative to the central gate member. With this arrangement, the two gate arms fold balanced with one another and reach their folded positions at the same time opposite sides of the vehicle.

BRIEF DESCRIPTION OF THE DRAWINGS

The above as well as other advantages and features of the present invention will be described in greater detail according to the preferred embodiments of the present invention in which.

DETAILED DESCRIPTION ACCORDING TO THE PREFERRED EMBODIMENTS OF THE PRESENT INVENTION

Figure 1:
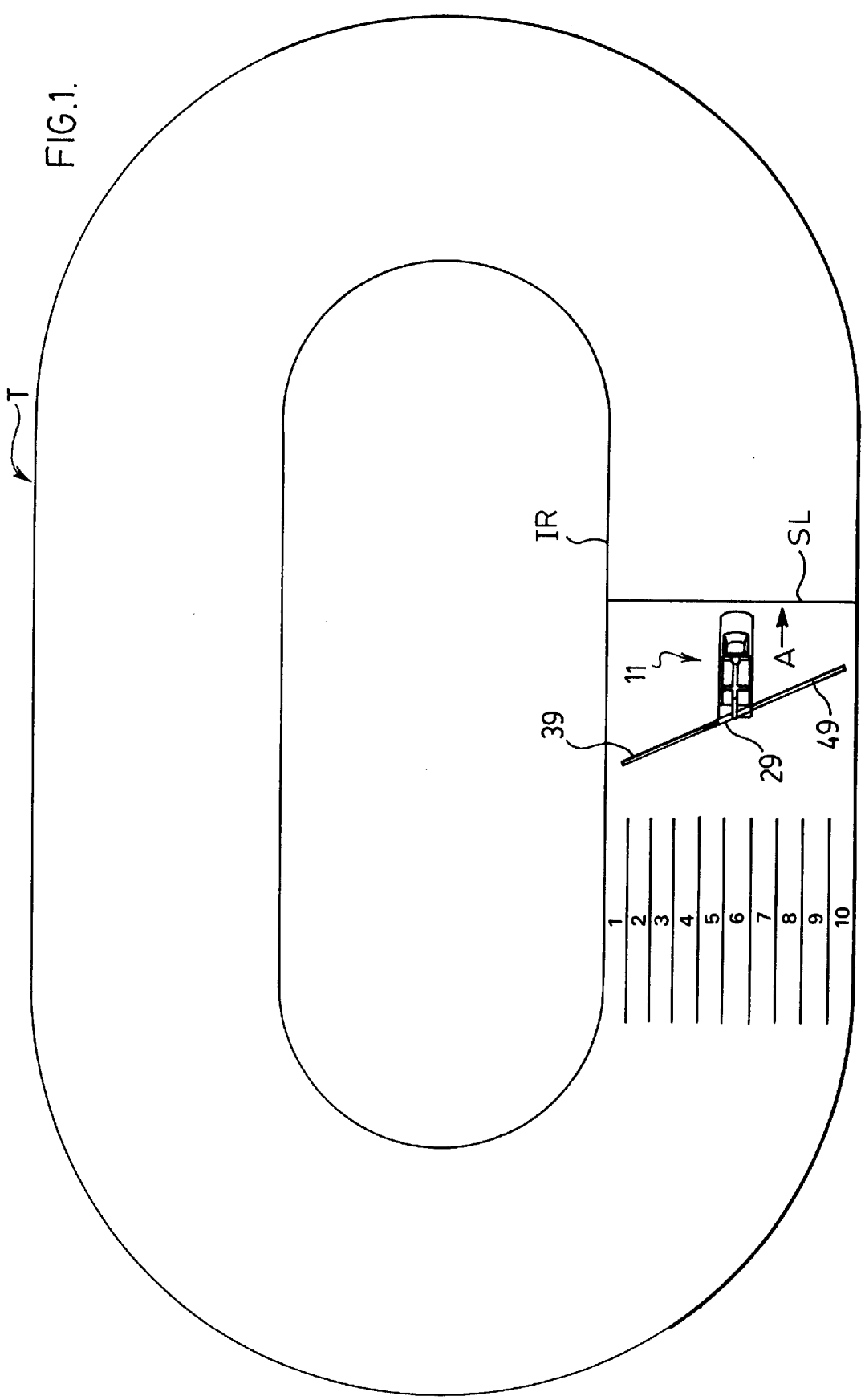
FIG. 1 is a plan view looking down on a race track with a vehicle carrying starter assembly having a gate system in the starting position according to a preferred embodiment of the present invention.

FIG. 1 shows an oval track T of the type used for harness horse racing. This track is divided into a plurality of lanes 1 through 10. Lane 1 is located along the inner rail IR of the track. A starting line SL is provided across the track.

Harness horses which run on the track draw starting positions in any one of the lanes 1 through 10. Traditionally, horses in the outer lanes and particularly in lanes 7 through 10 have very little chance of winning the race. This is principally due to the fact that all of the horses attempt to get to the inner rail before the first turn in the race.

In accordance with the present invention, all of the horses are given an equal opportunity to achieve the rail position through the provision of a novel vehicle and starter assembly combination generally indicated at 11. It will only be the particular horses talent rather than the lane which is drawn that will determine the outcome of the race.

Figure 2:
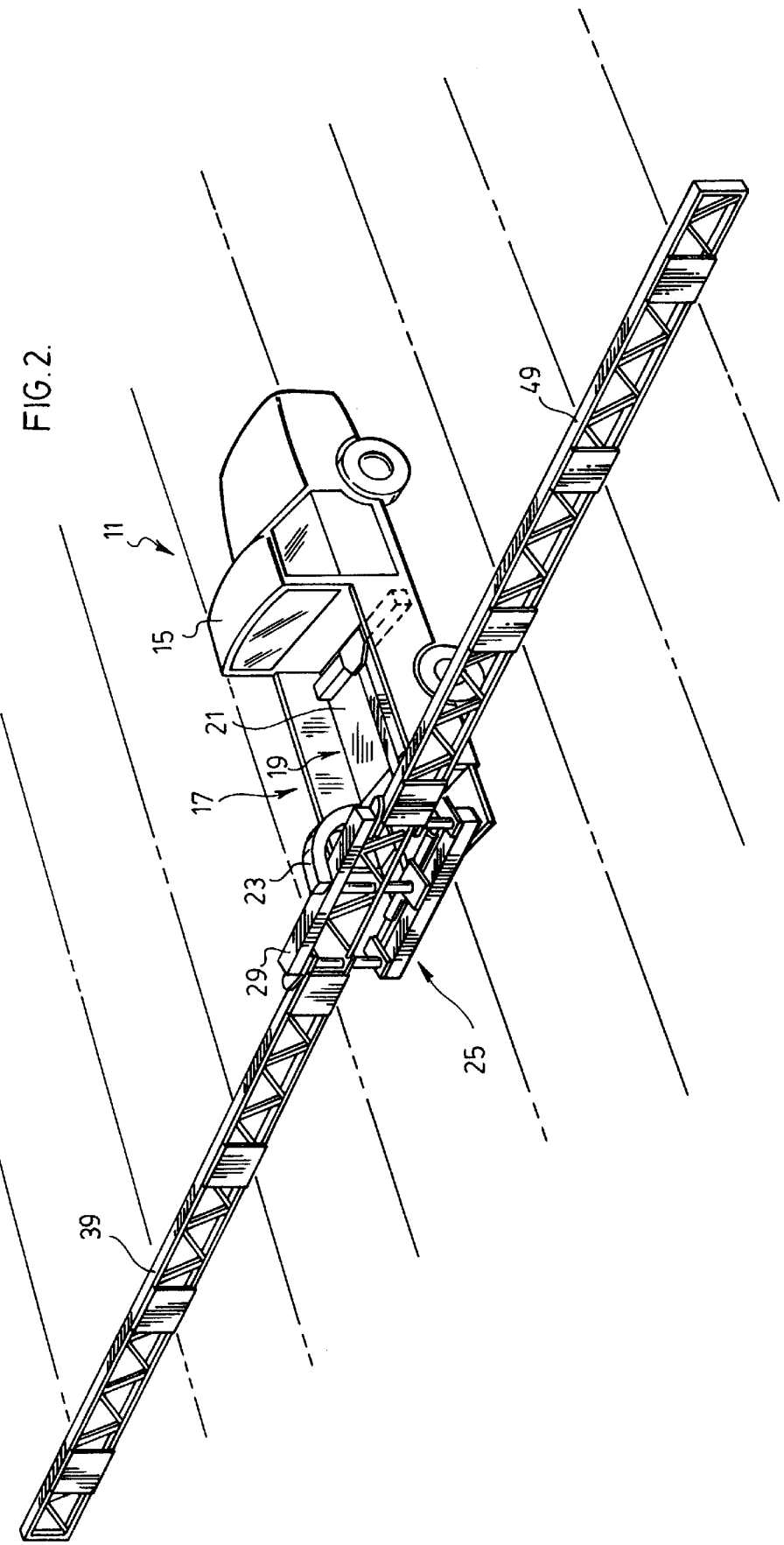
FIG. 2 is a rear perspective view looking down on the vehicle and starter assembly of FIG. 1.

The vehicle and starter assembly combination 11 is better seen in FIG. 2 of the drawings. The vehicle itself is in this case a truck having an open bed generally indicated at 17 for receiving a vehicle mounting portion 19 of the starter assembly. The vehicle mounting portion 19 has a foot 21 which actually mounts within the truck bed 17 and a rearward extension in the form of an arcuate arm 23 which extends rearwardly of the truck bed. This arm supports a gating system generally indicated at 25.

Figure 3:
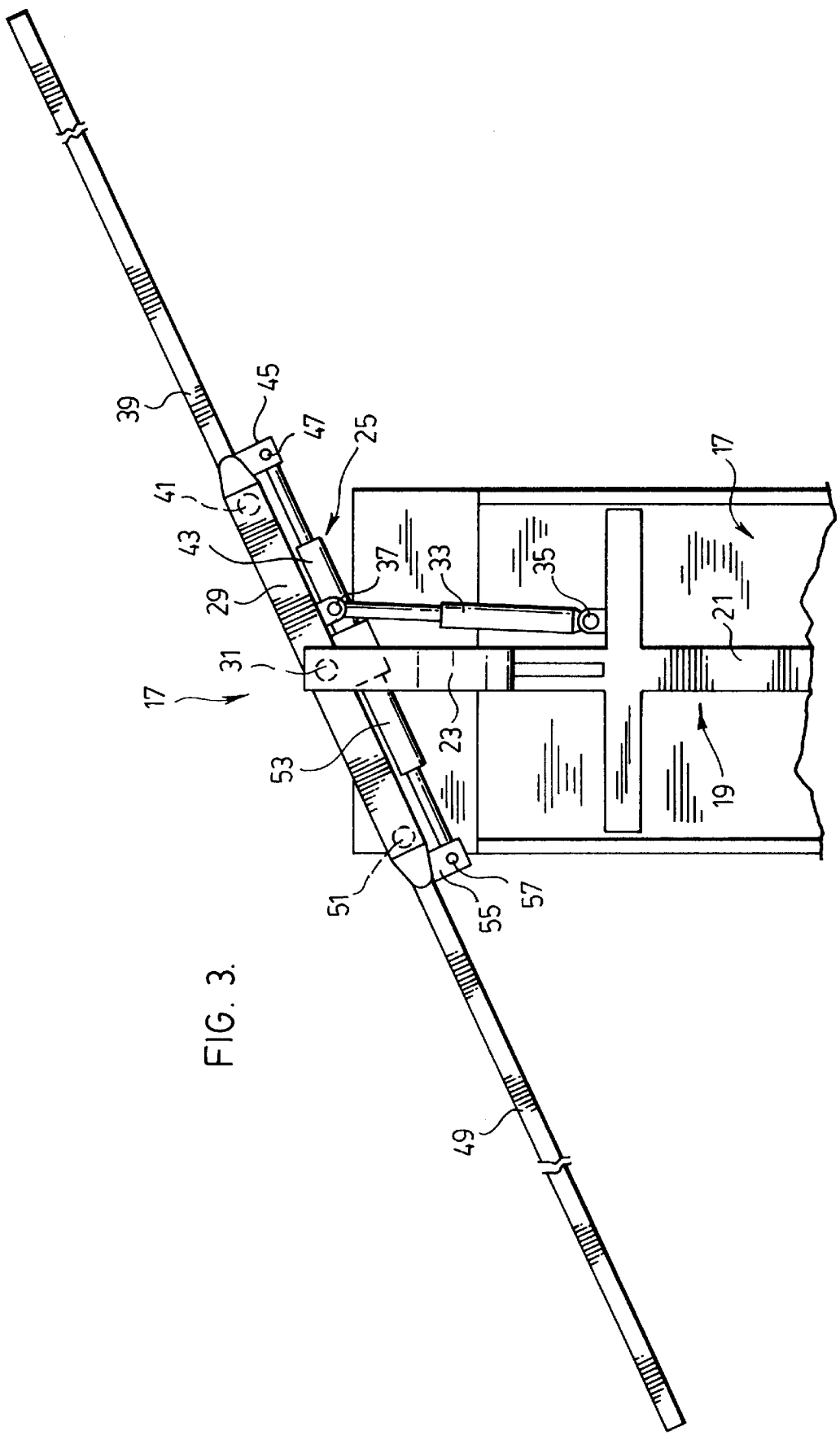
FIG. 3 is a top view of the starter assembly of FIG. 2 in the starting position.
Figure 4:
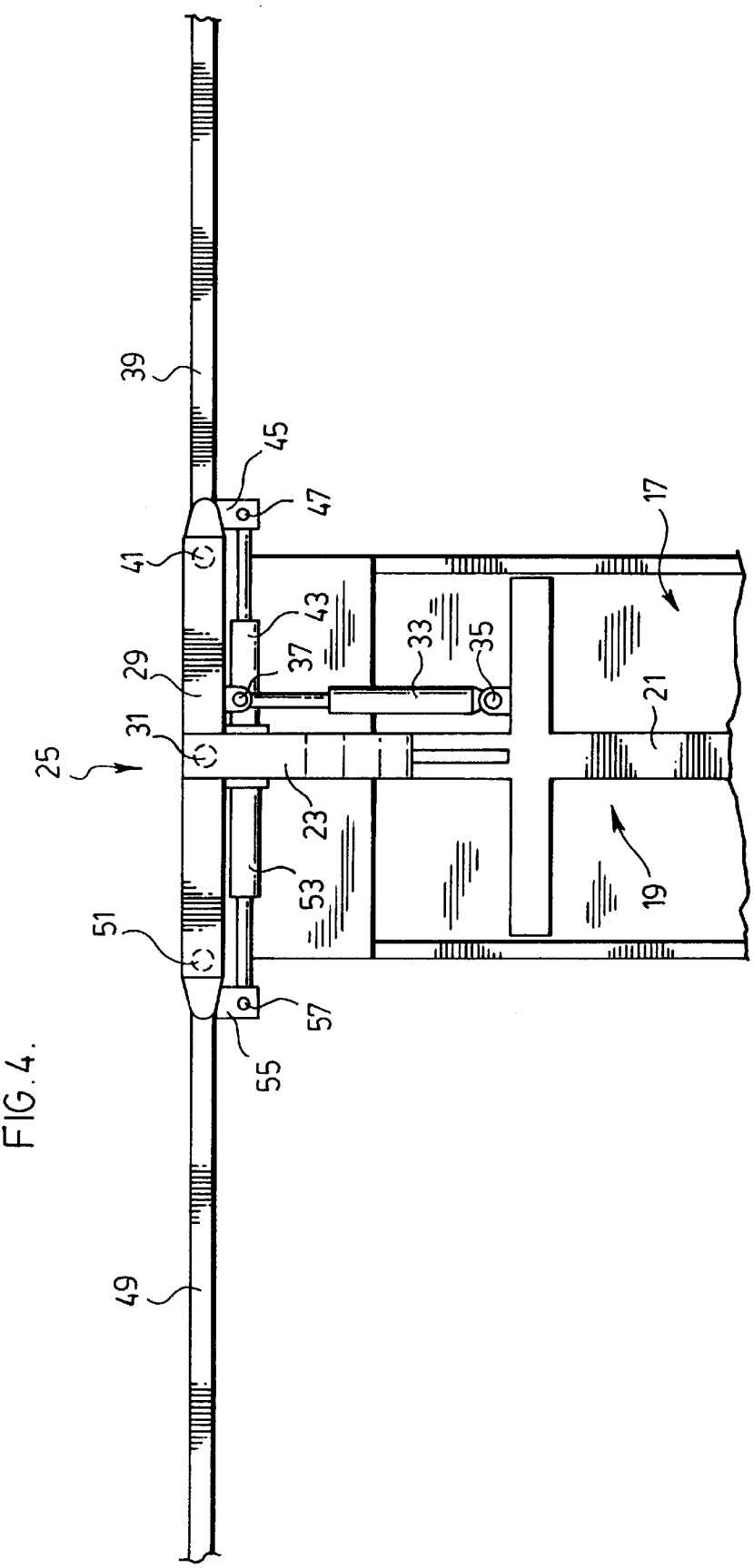
FIGS. 4 and 5 are further top views showing the folding action of the gate system of the starter assembly of FIGS. 2 and 3.

The gating system, as best seen in FIGS. 3 and 4 of the drawings, comprises a gate member 29 located centrally of the gating system between a pair of equal length gate arms 39 and 49. Gate member 29 is pivotally mounted at 31 to arm 23. Gate member 39 is pivotally mounted at 41 to one end of gate member 29 and gate arm 49 is pivotally mounted at 51 to the other end of the gate member.

A piston 33 is pivotally secured at 35 at one of its ends to the foot 21 of the vehicle mount and is pivotally secured at 37 at its other end to the gate member 29. A piston 43 is pivotally secured at 47 to an extension 45 of gate arm 39. A further piston 53 is pivotally secured at 57 to extension 55 of gate arm 49.

Returning to FIG. 1, it will be seen that as the vehicle and starter assembly combination 11 moves down the track in the direction of arrow A towards the starting line SL gate member 29 and gate arms 39 and 49 are not only in line with one another but are angled diagonally across the track. The gate system is used as a guide for the horses running behind the gate system and in this case, because the gate system is diagonal relative to the track, the horses begin with a staggered start, i.e. the horse in lane number 1 starts behind the horse in lane number 2 which starts behind the horse in lane number 3, etc. However, each of the horses ends up running the same distance around the track because the horse in lane number 1 does not have to run across the track to achieve the rail position unlike all of the other horses running in lanes 2 through 10. The horse in lane 10 has to run the farthest across the track and therefore, has the greatest head start at the beginning of the race.

The degree to which the gate assembly is angled across the track is determined according to the overall length of the track. In the case of a shorter track, i.e. a ½ mile track, the gate system is set at a more severe staggered angle because the first turn comes up so quickly necessitating a much more severe angle for the outer horses to travel across the track before the first turn, whereas in a longer race track of, for example, 1 mile, the angle which must be taken by the horses in the outer lanes to reach the rail position before the first turn is much more gradual. Accordingly, the gating system will be set at a less severe staggered angle.

Figure 6:
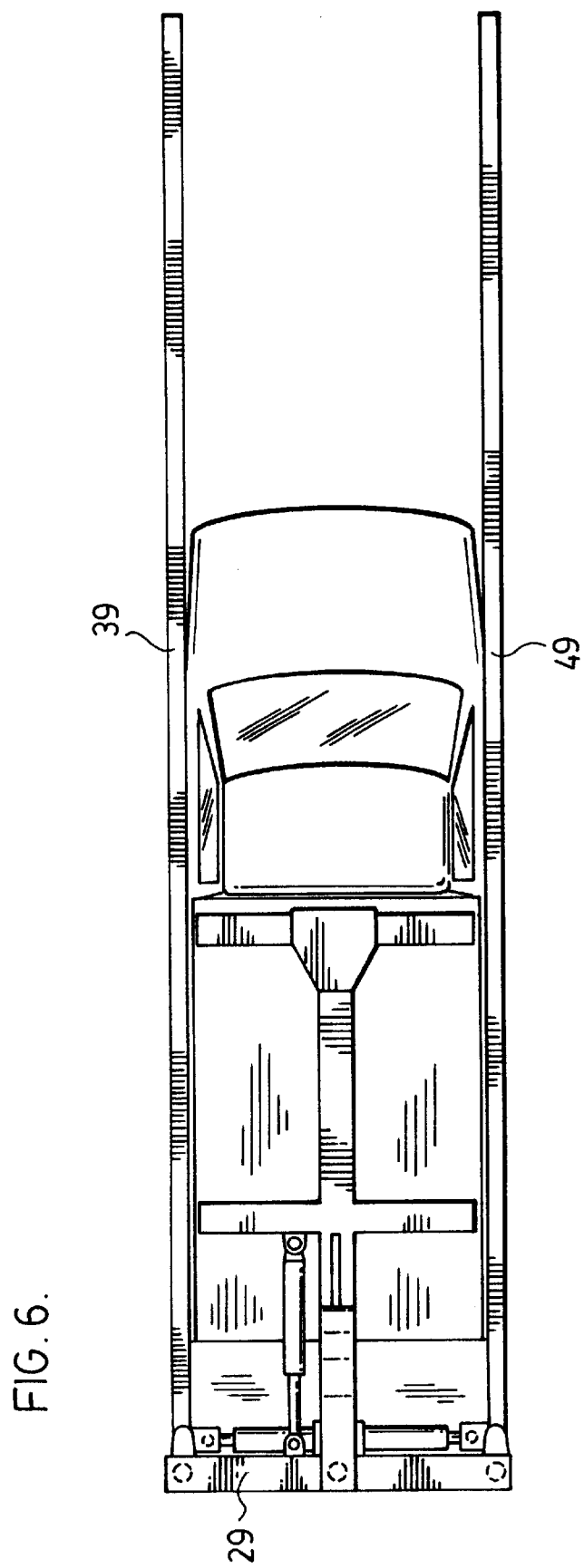
FIG. 6 is a top view of the vehicle with starter assembly of FIG. 1 with the gate system in the forwardly folded position.

As is known in the harness racing art, once the race has been started, vehicle 15 carrying the starter assembly accelerates away from the horses while at the same time, the gate system is moved from its extended angled configuration of FIGS. 1 through 3 to a stored configuration as shown in FIG. 6. Once the gate system has reached the FIG. 6 position, the vehicle can then pull off to the side of the track and allow the horses to pass as they continue around the track.

As will be seen in FIG. 6, each of the gate arms 39 and 49 is of a very substantial length and therefore it is important that the gate system fold in a manner which eliminates as much as possible imbalances on the vehicle. The sequence of folding the gate system is well shown in comparing FIGS. 3, 4 and 5 of the drawings.

More particularly, the first step in folding the system comprises moving gate member 29 from the position in which it is extending diagonally across the track to a position in which it is perpendicular to the straight away on the track while keeping arms 39 and 49 in line with the gate member. More particular by, the gating system is moved from the FIG. 3 to the FIG. 4 position. This is achieved by retracting piston 33 while keeping pistons 43 and 53 fully extended.

Figure 5:
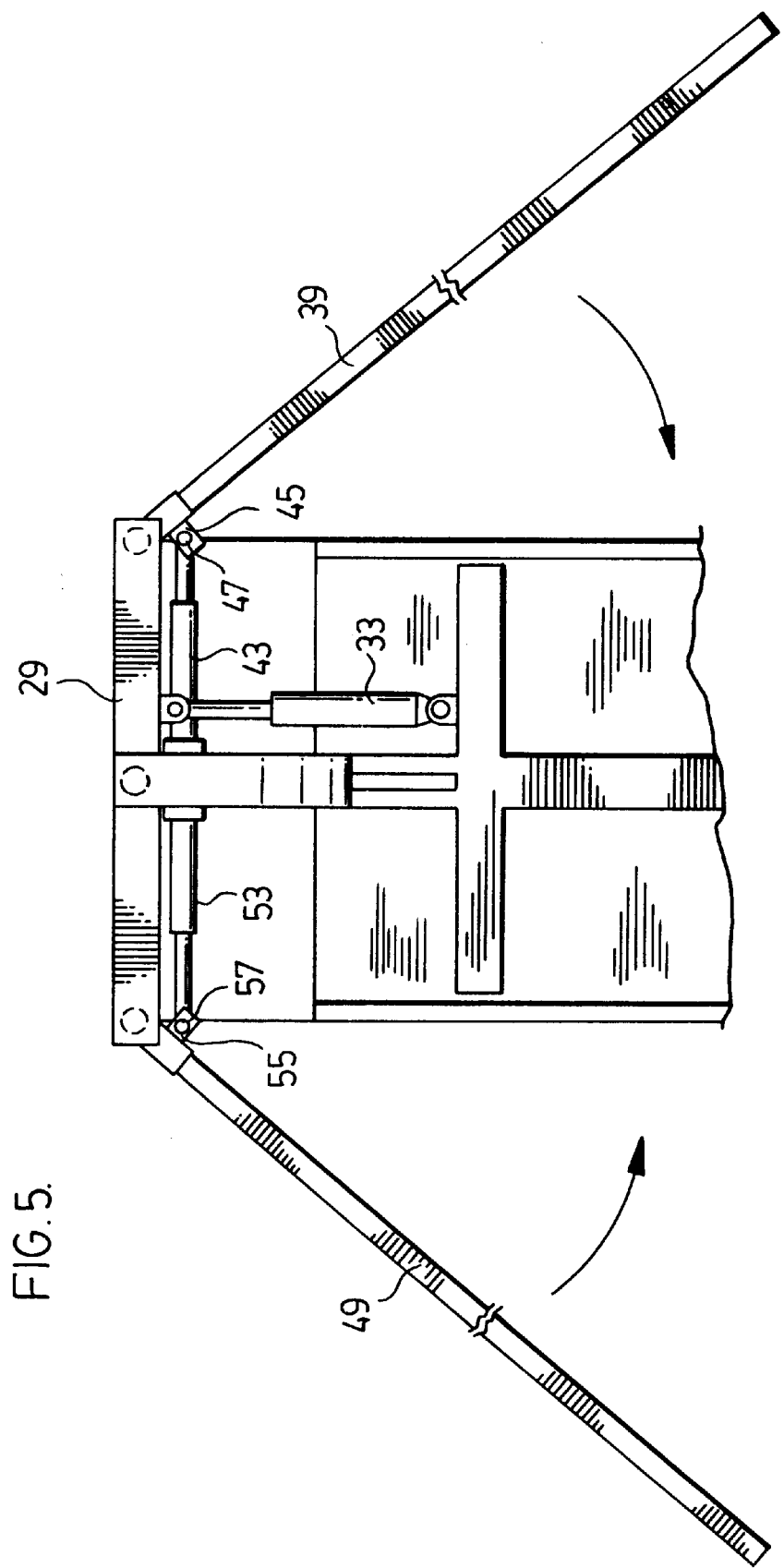

Once the gate system has reached the FIG. 4 position, pistons 43 and 53 are simultaneously retracted to bring the gate arms 39 and 49 inwardly towards the side of the vehicle as shown in FIG. 5 of the drawings. This inward pulling of the gate arms continues until they reach the FIG. 6 position. As will be seen in FIG. 5, both of the gate arms are always maintained at the same angle relative to the truck bed as they are being folded inwardly so that there is an equal balancing of the gate arms to each side of the truck at all times.

Although various preferred embodiments of the present invention have been described in detail, it will be appreciated by those skilled in the art, that variations may be made without departing from the spirit of the invention or the scope of the appended claims.

The embodiments of the invention in which an exclusive property or privilege is claimed are defined as follows:

1. A starter assembly used to provide a staggered running start for horses running around an oval track, said assembly comprising a base portion which mounts said assembly in a vehicle moving at the front of the race, and a gating system comprising a gate member and a pair of corresponding gate arms, one to either end of said gate member which is located centrally of said gating system, said gate member being pivotally secured to said base portion to swing said gate member to a starting position diagonally of the track and said gate arms being swingable to an in line position with said gate member for the staggered running start of the race, and after the race is started said gate member then being swingable with the gate arms remaining in the in line position away from the starting position to a ready to fold position transverse to the track after which the gate arms are then simultaneously folded forwardly of the gate member.

2. A starter assembly as claimed in claim 1, including a first piston which is rotatably coupled to and which is used for swinging said gate member, and second and third pistons which are rotatably coupled to and which are used for swinging said gate arms.

3. A starter assembly as claimed in claim 1, wherein said first piston operates independently of said second and third pistons and wherein said second and third pistons operate in unison with one another.

* * * * *